(12) United States Patent
Biaud

(10) Patent No.: US 8,714,644 B2
(45) Date of Patent: May 6, 2014

(54) CONVERTIBLE JUVENILE VEHICLE SEAT

(75) Inventor: Richard M. Biaud, Trementines (FR)

(73) Assignee: Cosco Management, Inc., Wilmington, DE (US)

( * ) Notice: Subject to any disclaimer, the term of this patent is extended or adjusted under 35 U.S.C. 154(b) by 150 days.

(21) Appl. No.: 12/943,313

(22) Filed: Nov. 10, 2010

(65) Prior Publication Data

US 2011/0115267 A1 May 19, 2011

(30) Foreign Application Priority Data

Nov. 16, 2009 (FR) ...................................... 09 58055

(51) Int. Cl.
*B60N 2/26* (2006.01)
(52) U.S. Cl.
USPC ..................................... 297/256.1; 297/250.1
(58) Field of Classification Search
USPC ................................ 297/216.11, 250.1, 256.1
See application file for complete search history.

(56) References Cited

U.S. PATENT DOCUMENTS

| | | | | |
|---|---|---|---|---|
| 5,567,007 A * | 10/1996 | Czernakowski et al. | .. | 297/250.1 |
| 5,630,645 A * | 5/1997 | Lumley et al. | ............. | 297/250.1 |
| 5,988,743 A * | 11/1999 | Drexler | ...................... | 297/250.1 |
| 6,382,722 B2 * | 5/2002 | Burleigh | ..................... | 297/250.1 |
| 6,746,080 B2 * | 6/2004 | Tsugimatsu et al. | ...... | 297/256.13 |
| 7,163,265 B2 * | 1/2007 | Adachi | ..................... | 297/256.12 |
| 7,168,762 B2 * | 1/2007 | Maciejczyk | .................. | 297/253 |
| 7,448,683 B2 * | 11/2008 | Rikhof | ....................... | 297/250.1 |
| 8,313,142 B2 * | 11/2012 | Xiao | ......................... | 297/256.16 |
| 2003/0047972 A1 * | 3/2003 | Burleigh et al. | ......... | 297/216.11 |
| 2006/0006714 A1 * | 1/2006 | Van Geer et al. | ........ | 297/256.16 |

FOREIGN PATENT DOCUMENTS

| | | |
|---|---|---|
| DE | 202009008293 | 10/2009 |
| FR | 2745535 | * 9/1997 |
| JP | 2003252094 | 9/2003 |

OTHER PUBLICATIONS

International Search Report dated Jul. 16, 2010, for French Application FR 0958055.

* cited by examiner

*Primary Examiner* — Philip Gabler

(74) *Attorney, Agent, or Firm* — Barnes & Thornburg LLP

(57) ABSTRACT

A vehicle seat for children includes a base and an armchair. The armchair includes a seat and a seat back. The seat back has in its upper portion at least one strap passage intended to receive a chest strap of a safety belt of a motor vehicle.

12 Claims, 4 Drawing Sheets

CONVERTIBLE JUVENILE VEHICLE SEAT

BACKGROUND

The present disclosure relates to child care, and particularly to vehicle seats for children, intended to be installed on the seats of motor vehicles. More particularly, the present disclosure relates to convertible juvenile vehicle seats that are convertible for use as forward- and rear-facing seats.

Rear-facing vehicle seats are adapted and approved for infants. These vehicle seats are provided to be installed in a rear-facing position, the child being turned towards the rear of the vehicle. They allow the child to be installed in a semi-reclined position, wherein it is sufficiently inclined so that the weight of his head is not fully supported by his neck and his back. Indeed, the back and the neck of children of this age are not yet sufficiently robust to support over a long length of time the weight of the head.

Forward-facing vehicle seats are adapted and approved for older children. The children are then installed in these vehicle seats in a seated position, and generally in a "forward-facing" position, directed towards the front of the vehicle.

SUMMARY

A vehicle seat for children in accordance with the present disclosure comprises a base and an armchair. The armchair comprises a seat and a seat back.

In illustrative embodiments, the seat back has, in its upper portion, at least one strap passage configured to receive a chest strap of a safety belt of a motor vehicle. The strap passage(s) are configured in such a way as to receive the chest strap in the forward-facing position and in the rear-facing position. The chest strap circulates in all of the strap passages provided on said upper portion of the seat back in the forward-facing position and in the rear-facing position.

At least one indicator is placed in the vicinity of each of the strap passages in illustrative embodiments. The indicator(s) provide means for indicating that the strap passages are able to receive the chest strap in the forward-facing position and in the rear-facing position.

As such, the installation of the vehicle seat is facilitated, regardless of its position. Indeed, there is no longer any question for the user as to the adequate locations for the chest strap: he knows indeed that, in any case, all of the available strap passages must be used symmetrically.

In illustrative embodiments, the upper portion of the seat back has two strap passages placed respectively on the two lateral edges of the seat back. These passages are slots crossing the lateral edges. This approach provides good accessibility, in both positions, and of a simple and intuitive installation. In illustrative embodiments, the strap passage(s) have at least two separate zones. In this case, when a chest strap is set into place, the chest strap circulates in a first zone of the slot of a first of the lateral edges and in the second zone of the slot of the second of the lateral edges.

In the case where the strap passages are slots, each slot comprises two slot portions in illustrative embodiments, an entry portion, and a bottom portion. The entry portion is substantially vertical and defines at least one bearing surface for the portion of said chest strap closest to the reel of said strap. This entry portion is reinforced in such a way that the chest strap can come to bear on its two lips, according to that the armchair is in the forward-facing position or in said rear-facing position. Indeed, according to the position of the armchair, the chest strap comes to bear on one or the other of the lips of this portion of the slot. The bottom portion is preferentially directed towards the rear of the seat back and is configured to define a bearing surface for the portion of said chest strap farthest from the reel of said strap.

In illustrative embodiments, the armchair can take two positions of assembly in relation to the underlying base, a forward-facing position, and a rear-facing position. In this case, the base has a single ventral (abdominal) strap passage sized to receive a lap belt included in the vehicle safety belt system. As such, the mounting is simplified, without risk of error, not only for the chest strap, but also for the ventral (abdominal) strap. Indeed, all of the strap passages (globally) are used.

BRIEF DESCRIPTION OF THE DRAWINGS

Other characteristics and advantages of the present disclosure shall appear more clearly when reading the following descriptions of illustrative embodiments, given for the simple purposes of illustration and in a non-restrictive manner, and of the annexed drawings, wherein.

DETAILED DESCRIPTION

Figure 6A:
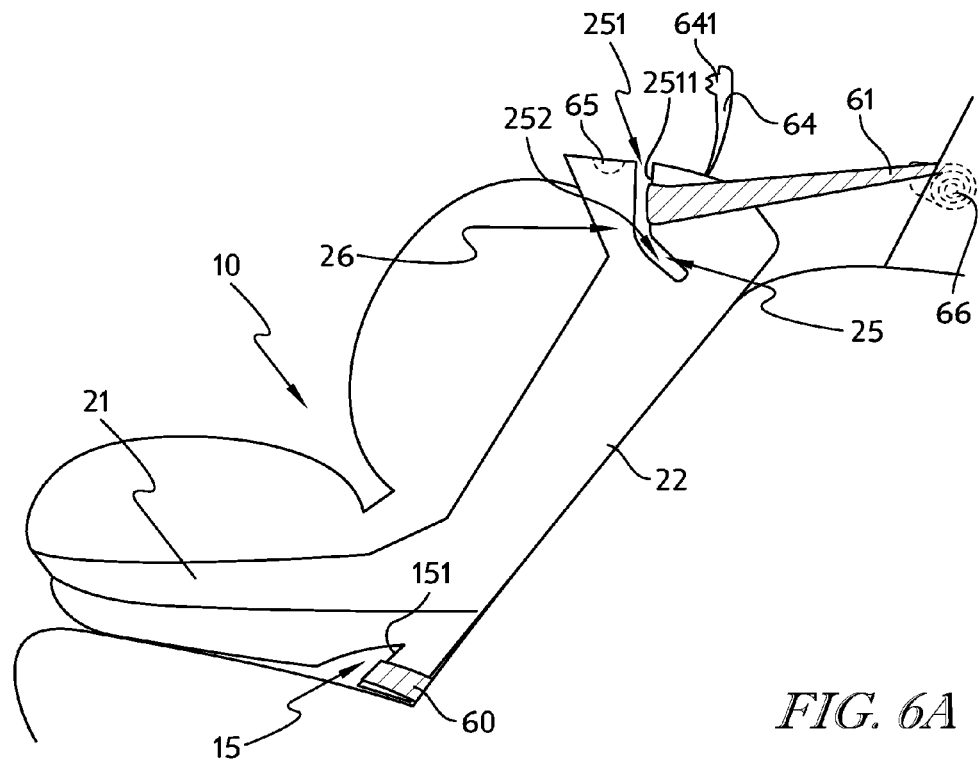
FIGS. 6A and 6B show the setting into place of the chest strap on each side of the seat in FIGS. 3-5, in the forward-facing position.
Figure 6B:
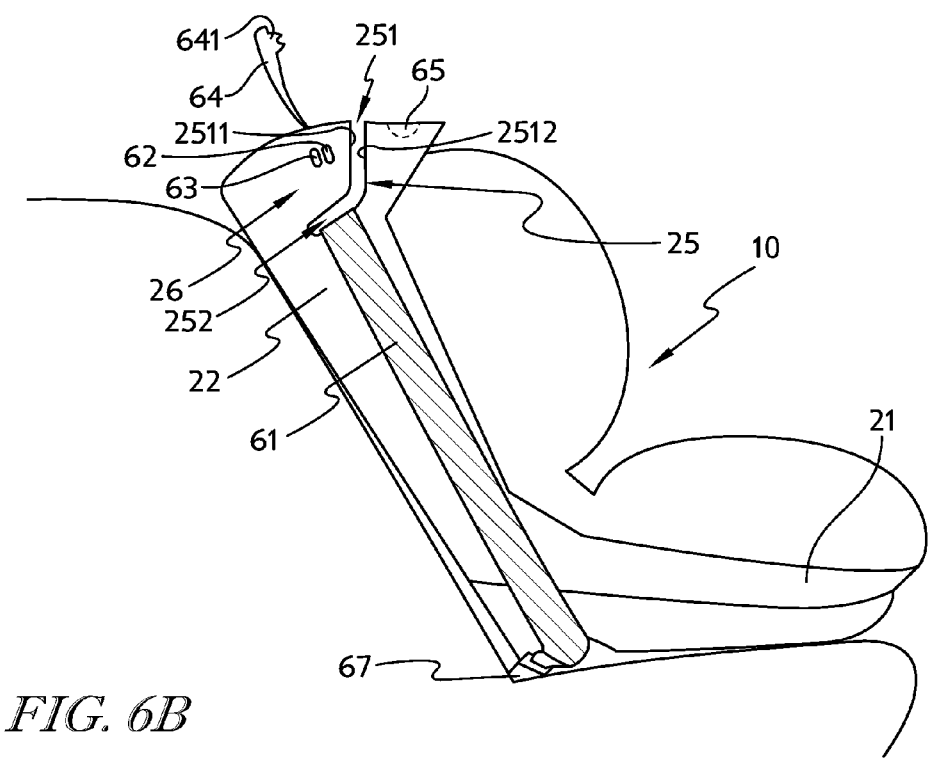
Figure 7A:
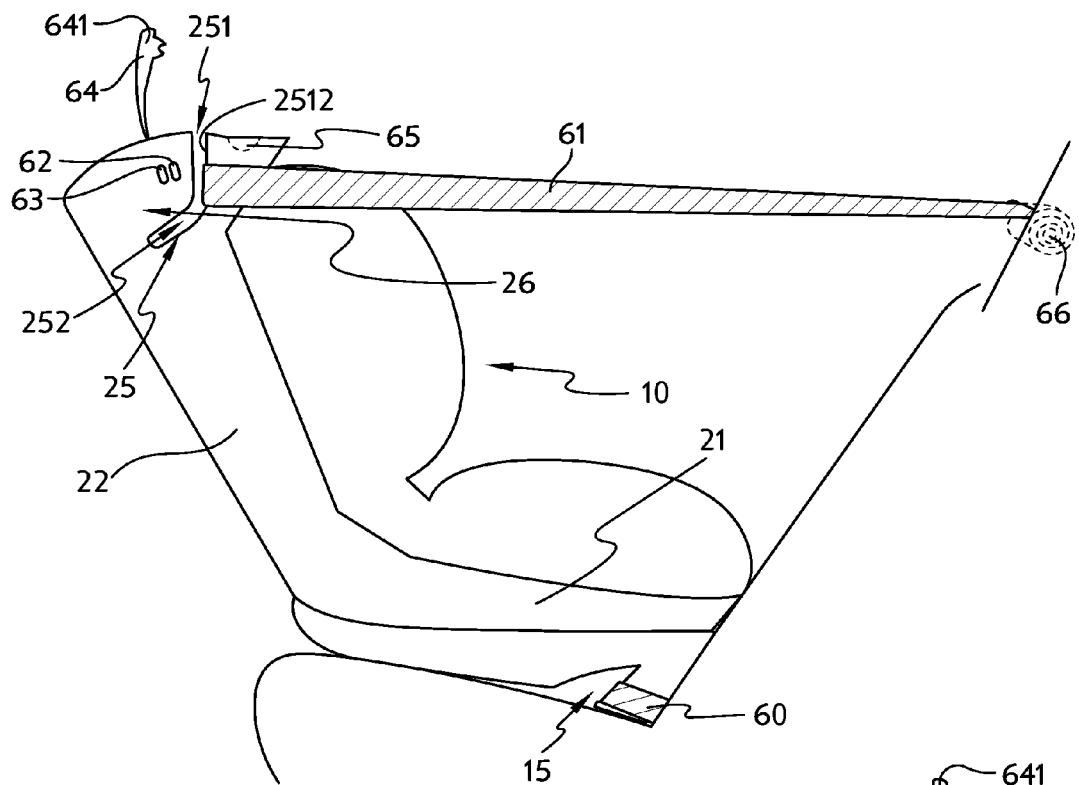
FIGS. 7A and 7B show the setting into place of the chest strap on each side of the seat in FIGS. 3-5, in the rear-facing position.
Figure 7B:
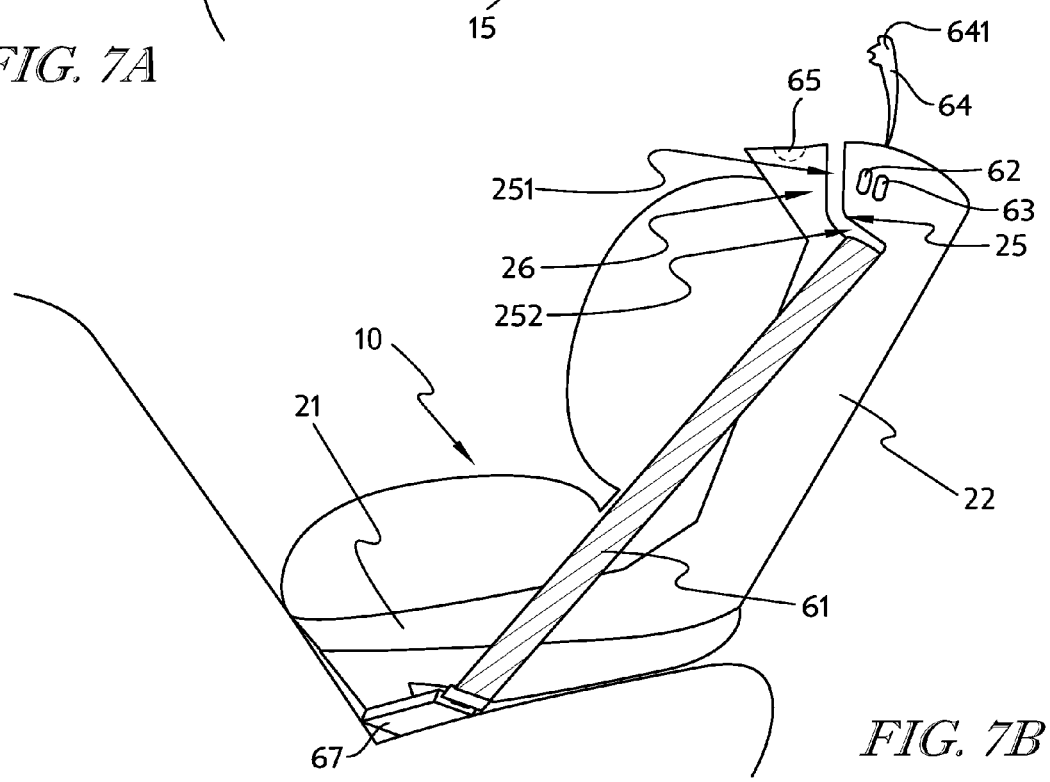

The present disclosure relates to a reversible vehicle seat 10 that can be installed in a forward-facing position on a passenger seat in a vehicle as suggested in FIGS. 6A and 6B or in a rear-facing position as suggested in FIGS. 7A and 7B. Seat 10 comprises a base 1 and an armchair 2. In illustrative embodiments, the base 1 takes a single position on the passenger seat in the vehicle and the armchair 2 can take two positions 180° from one another in relation to the underlying base 1. This base 1 can be of any suitable type. According to a particular illustrative embodiment, described in more detail in what follows, base 1 has a bevelled section.

Figure 1:
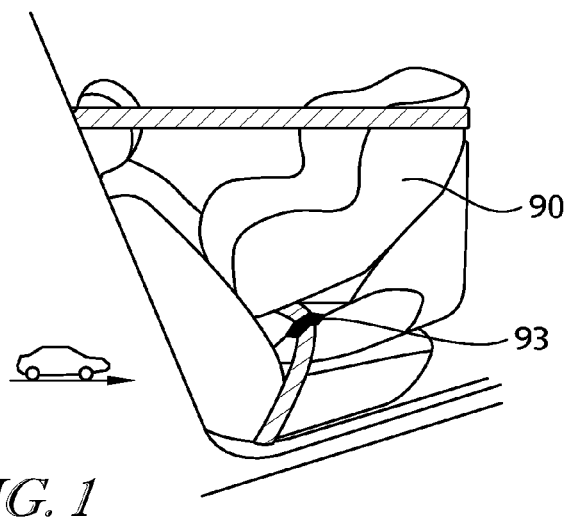
FIGS. 1 and 2 are diagrammatic views of a vehicle seat installed in a motor vehicle, respectively in a rear-facing position and forward-facing position.
Figure 2:
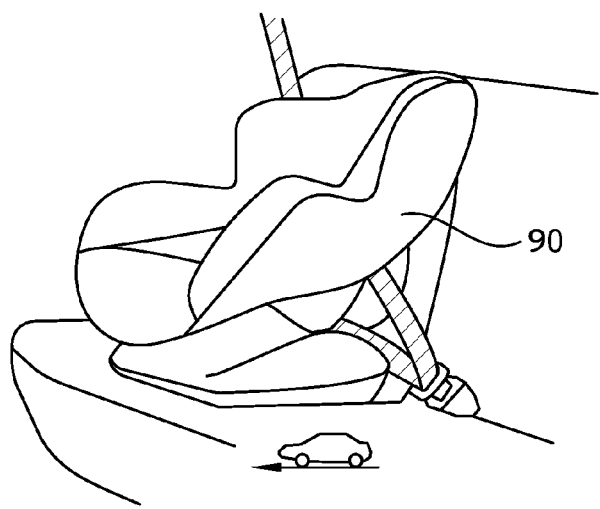

Certain vehicle seats are designed to be reversible and are often identified as convertible vehicle seats. FIGS. 1 and 2 provide diagrammatic representations of a juvenile vehicle seat 90 designed to be able to be used in two positions. Juvenile vehicle seats 90 can be installed in a forward-facing position such that the child is seated (position shown in FIG. 2) and in a rear-facing position, such that the baby is in a semi-reclined position (position shown in FIG. 1). In the forward-facing position, the inclination of the seat is generally adjustable. In illustrative embodiments, the juvenile vehicle seats are often maintained on the seat or the bench seat of the vehicle using one of the vehicle safety belts.

As shown in FIGS. 1 and 2, it is then required, on such juvenile vehicle seats that can have two positions of installation, to provide two different systems of fastening by the straps of the safety belt of the vehicle, a first system for the forward-facing fastening and a second system for the rear-facing fastening. Indeed, as the length of the strap is regulated, the latter must be complied with in the two positions of the juvenile vehicle seat (with the rear-facing position being highly consuming of the strap length).

In addition, the locations of the strap passages are defined in order to guarantee an effective maintaining, in each position. The passage of the ventral strap (i.e., lap belt) 93 visible in FIG. 1 can be used only in the rear-facing position.

Figure 3:
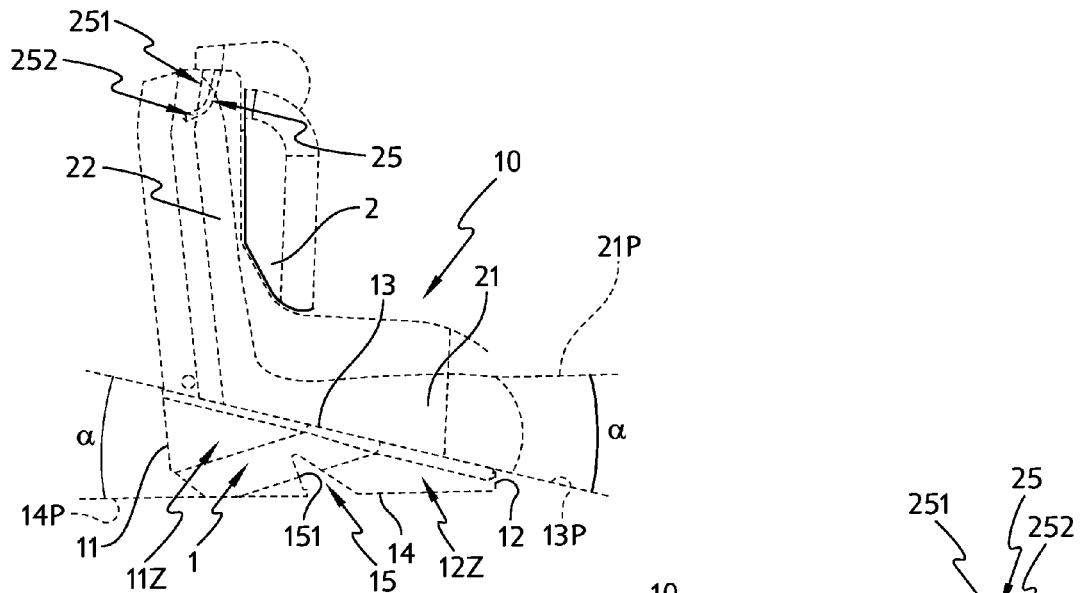
FIG. 3 shows an example of a vehicle seat according to the present disclosure, in its forward-facing position, viewed from the side.
Figure 5:
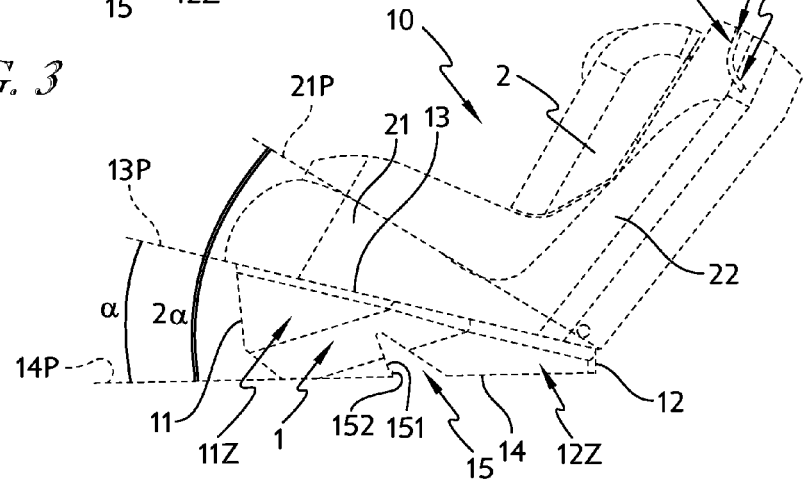
FIG. 5 shows the seat in FIGS. 3 and 4 in its rear-facing position, viewed from the side.
Figure 4:
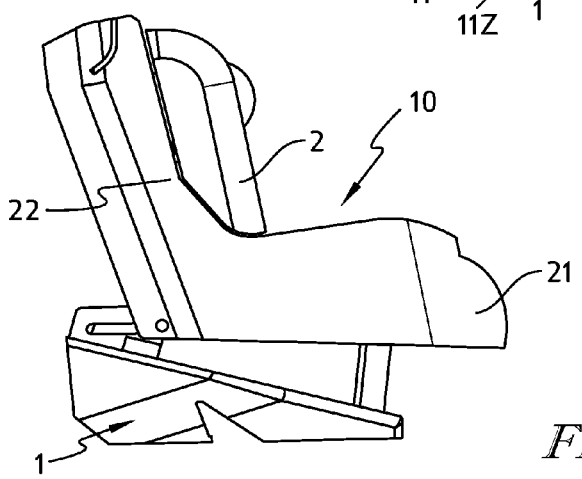
FIG. 4 shows the seat in FIG. 3 in an alternative position, wherein the seat is inclined in relation to the base.

A vehicle seat 10 in accordance with an illustrative embodiment of the present disclosure is shown in FIGS. 3-5. This vehicle seat 10 is therefore comprised of an armchair 2 fixed on a base 1. The base 1 is the portion of the vehicle seat 10 which is intended to be placed on the passenger seat of a motor vehicle as suggested in FIGS. 6A and 6B. The armchair 2 is the portion of the vehicle seat 10 wherein the child is to be installed. This armchair 2 in particular comprises a seat 21 and a seat back 22.

The base 1 has, in the plane of symmetry of the vehicle seat 10, a section of substantially triangular form in an illustrative embodiment in accordance with the present disclosure. As such, as suggested in FIGS. 3 and 5, it has a first end zone, close to one of its edges 11, called the thick edge, and corresponding to a side of the triangle defined hereinabove, thicker than a second end zone, close to an opposite edge 12, called the thin edge, and corresponding substantially to the tip of the triangle that lies opposite to edge 11. The upper surface 13 of this base (defining a reference plane 13P) forms as such, in the plane of symmetry of the seat, an angle $\alpha$ (shown in FIGS. 3 and 5) with the lower surface 14 of the base (defining a base plane 14P). This angle $\alpha$ is located substantially between the reference plane 13P and a seat plane 21P defined by the seat 21 of the vehicle seat 10.

The armchair 2 can be mounted on the base 1 in two configurations at the option of a caregiver in accordance with the present disclosure. The first of these configurations, called "forward-facing," is shown, for example, in by FIGS. 3, 4, 6A, and 6B. In this forward-facing configuration, the front of the seat 21 of the armchair 2 is placed above a second end zone 12Z of the base 1 and the seat back 22 of the armchair 2 is placed above a first end zone 11Z of the base 1.

This forward-facing configuration is provided in order to use the vehicle seat 10 in the forward-facing position as suggested in FIGS. 6A and 6B. As such, the lower surface 14 of the base 1 must be placed against the passenger seat of the motor vehicle, and the thick edge 11 of the base 1 bears against the bottom of the seat back of this passenger seat of the motor vehicle. The angle that the seat 21 forms in relation to the lower surface of the base 14 is adapted so that the seat 10, when it is installed in the forward-facing position on the seat of the vehicle having itself an inclination, offers a seated position to the child.

The second of these configurations, called "rear-facing" configuration, is shown, for example, in FIGS. 5, 7A, and 7B. In this configuration, the front of the seat 21 of the armchair 2 is placed above the first end zone 11Z of the base 1 and the seat back 22 of the armchair 2 is placed above the second end zone 12Z of the base 1.

The position of the armchair 2 in the rear-facing configuration is symmetric to its position in the forward-facing configuration, in relation to an axis perpendicular to the upper surface 13 of the base 1. The upper surface 13 of this base 1 forming an angle $\alpha$ with the lower surface 14 of the base 1, the axis of symmetry forms the same angle $\alpha$ with the perpendicular to the lower surface 14 of the base 1.

This rear-facing configuration is provided for a use of the vehicle seat 10 for children in a "rear-facing" position relative to the front of the vehicle as suggested in FIGS. 7A and 7B. In this configuration, the angle that the seat 21 of the armchair 2 forms with the base surface, corresponding to the lower face 14 of the base 1 is different (by an angle of $2\alpha$) from the one that it forms in the forward-facing configuration shown in FIG. 3, allowing the vehicle seat 10, when it is installed in the vehicle rear-facing, to offer a semi-reclined position (or semi-seated position) to the child.

As such, in the forward-facing configuration, the base plane 14P and the seat plane 21P of the seat 21 are substantially parallel as suggested in FIG. 3, and thus form an angle substantially equal to $\alpha-\alpha=0$. In the rear-facing configuration however, the base plane 14P and the seat plane 21P of the seat 21 form an angle substantially equal to $\alpha+\alpha=2\alpha$ as suggested in FIG. 5. This difference in angle allows the sitting angle of the vehicle seat 10 for children to be optimal, in the forward-facing position as well as in the rear-facing position, while offsetting the proper inclination of the passenger seat of the vehicle seat. Note that no adjustment (particular in terms of the inclination) other than the change in position of the armchair 2 in relation to the base 1 is to be carried out between these two positions.

1. Fastening of Vehicle Seat 10 to the Passenger Seat: Ventral (Abdominal) Strap In the two configurations for use of the vehicle seat according to the illustrative embodiment of the present disclosure shown, the base 1 is provided to be placed in the same position on the passenger seat of the motor vehicle. As such, the thick side 11 of this base 1 is, in these two positions, close to (and more preferably in contact with the) bottom of the seat back of the passenger seat of the motor vehicle.

The base 1 can as such have a single system of fastening to the passenger seat of the motor vehicle, which will be used in the two possible configurations of the vehicle seat 10. There are in fact two positions for the armchair 2 in relation to the base 1, but a single position for the base 1 in relation to the passenger seat of the vehicle.

This fastening system in accordance with the present disclosure can in particular be accomplished using a single strap. The vehicle seat 10 shown in FIGS. 3-5 is as such designed to be fixed to the passenger seat of the vehicle by the vehicle safety belt. A slot 15 for passing the strap extending over the entire width of the base 1 is arranged in the lower surface 14 of the base 1 and allows for the passage of the ventral (abdominal) strap 60 of the safety belt through the base 1, the ventral strap 60 taking bearing against a substantially vertical surface 151.

Advantageously, the slot 15 has the form of a notch, with an opening for the introduction of the strap 15 wider than the base, in order to facilitate the introduction of the strap 15. A retaining zone 152 can be provided at the edge of the bearing surface 151 as suggested in FIGS. 3 and 5, in the vicinity of the opening of the slot 15, in order to facilitate the setting in place and the maintaining of the ventral strap 60. The bearing surface 151 can be slightly inclined in relation to the vertical, the bottom of the slot 15 in the direction of the thick edge 11, always for providing the guiding and the maintaining of the strap 15.

As such, when the ventral strap 60 is thrust against the bearing surface 151 and taught, the lower portion of the vehicle seat 10 is retained effectively. Illustratively, the slot 15 is located substantially under the seat back 22 of vehicle seat 10, when the seat 10 is in forward-facing position as suggested in FIGS. 6A and 6B.

The present disclosure can also apply in the case of a non-bevelled base, and where applicable reversible, for example at the same time as the armchair. In this case, preferentially, a single passage of the ventral strap is provided, the latter being designed in such a way as to define two bearing surfaces each able to receive the ventral strap, according to the position, rear-facing or forward-facing, of the base 1.

2. Fastening of Vehicle Seat 10 to the Passenger Seat: Chest (Shoulder) Strap According to the present disclosure, the upper portion of the seat back 22 comprises, on each of its lateral edges (extending towards the front of the seat), a strap passage 25, intended to receive the chest (shoulder) strap 61 of the safety belt of the vehicle. As shown in FIGS. 6A, 6B, 7A, and 7B, these two strap passages are designed in such a way as to be able to be used in the two positions of the armchair 2, forward-facing or rear-facing.

As such, there are only two strap passages possible regardless of the position of the armchair 2, and these two strap passages must be used, in all cases. The user therefore no longer has to hesitate to know which strap passages he must use, or not use according to the position of the armchair 2. The user knows that he must use the two available passages. Once the installation has been carried out, there are no unused strap passages and the user has no more hesitation, and does not risk placing the chest strap 61 in incorrect strap passages.

The strap passages are, in the illustrative embodiment shown, slots 25 crossing the lateral edges 26 of the seat back, extending towards the rear of the seat. More precisely, the slots have two portions 251 and 252, forming an angle between 90° and 160° in illustrative embodiments. An entry portion 251 is provided as suggested in FIGS. 1 and 6A to allow for the introduction of the strap, and extending more preferably substantially vertically. A bottom portion 252, directed more preferably towards the rear of the armchair 2 starting from the end of the entry portion 251.

The two portions of slots 251 and 252 are designed to define several bearing surfaces of the chest strap 61 as suggested in FIGS. 6A, 6B, 7A, and 7B. More precisely, regardless of the position, forward-facing or rear-facing, a bearing surface of the entry portion 251 is used for one of the slots, and for the other of the slots a bearing surface of the bottom portion 252.

With further precision, and as is shown in FIGS. 6A (forward-facing position) and 7A (rear-facing position), the lateral edge closest to the reel 66 of the safety belt, mounted generally on the body of the vehicle, and therefore most of the time the edge that that is closest to a door, receives the chest strap 61 in the entry portion 251 of slot 15.

Note that this entry portion 251 therefore has the characteristic of defining two bearing surfaces, corresponding to each of the lips, or edges of the slot. Indeed, in the forward-facing position (FIG. 6A), it is the edge 2511 directed towards the rear of the armchair 2 which is used as a bearing surface, while in the rear-facing position (FIG. 7A) it is the edge 2512, directed towards the front of the armchair 2 which receives the chest strap 61. This supposes that this portion of the slot 25 be designed and reinforced in order to support the efforts applied by the chest strap 61 in the two positions i.e. on each of the edges 2511 and 2512.

On the other side of the vehicle seat 10, shown in FIGS. 6B and 7B and corresponding therefore to the side that is farthest from the reel 66, generally towards the middle of the vehicle, it is however the bottom portion 252 which is used to receive and serves as a bearing surface for the chest strap 61. As such, in the forward-facing position (FIG. 6B), the chest strap 61 extends substantially in parallel to the seat back 22, in order to be attached by means of locking 67 of the vehicle.

In the rear-facing position (FIG. 7B), the chest strap 61 forms a slight angle with the seat back 22, in order to extend according to an axis substantially perpendicular to the bottom portion 252 of the slot 25. Between the two slots 25, the chest strap 61 circulates substantially along the seat back 22, or according to a predefined path, implementing for example a deflector.

Due to the fact that the same strap passage 25 is used in the two positions, the vehicle seat 10 according to the present disclosure has a marking adapted according to which two separate indicators 62 and 63 are placed in the vicinity of each strap passage 25. A first indicator 62 corresponds to the identification of a strap passage for the forward-facing use. A second indicator 63 indicates that the strap passage must also be used rear-facing.

Here, in an illustrative embodiment in accordance with the present disclosure, these two indicators 62 and 63 can be elements of color, for example blue and red respectively, according to the standard currently in effect. It can also entail a single, two-color indicator (for example a circle of which one half is red and the other blue) or any suitable mention, for example printed or engraved, comprising a text or an adequate symbol to specify that the slots 25 must be used in the two positions. It is also possible, if a future standard so calls for, to define a standardized indicator, for example a third color other than red and blue, for such strap passages dedicated to both positions.

This indicator can also be defined by the slots themselves, of which the plastic parts or at least one part from among them, can bear the colors or other adequate indicators. These colors can for example be provided on the various bearing surfaces. These indicators shall be present also on the instructions.

Note, moreover, that the seat 10 of the present disclosure is provided, according to the illustrative embodiment shown in FIGS. 6A to 7B, with slot-closure elements 64 making it possible to close or release the access to the slots 25. These slot-closure elements 64 are here mounted for pivotable (or other) movement to seat back 22, and have at the end elements 641 of snapping, provided to cooperate with a corresponding female portion 65 formed in the seat back 22. When they are closed, access to the slot 25 is impossible and a chest strap 61 already installed cannot be removed.

To install, or remove, the seat 10, whether to remove it from the vehicle or modify the forward-facing position or rear-facing position of the armchair 2, it is required to open these slot-closure elements 64 in order to take out or introduce the chest strap 61 relative to the strap-receiving slots 25. When the installation is complete, these slot-closure elements 64 can be closed. The fact that, during use, these slot-closure elements 64 are closed is an indicator of the fact that the installation has been carried out correctly (with the condition, of course, that the chest strap 61 is present in the strap-receiving slots 25).

Vehicle seat 10 can be used, as selected in a forward-facing configuration, or in a rear-facing configuration, and making it possible to simplify the fastening of the seat 10 to the vehicle. Vehicle seat 10 is configured to minimize the risks of poor installations of the straps of the safety belt in a rear-facing position, as well as in a forward-facing position.

Vehicle seat for children comprises a base 1 and an armchair 2. The armchair 2 comprises a seat 21 and a seat back 22. The seat back 22 has, in its upper portion, at least one strap passage 25, intended to receive a chest strap 61 of a safety belt of a motor vehicle. The strap passage(s) 25 are configured in such a way as to receive the chest strap 61 in the forward-facing position and in the rear-facing position. The chest strap 61 circulates in all of the strap passages 25 provided on said upper portion of said seat back 22 in said forward-facing position and in said rear-facing position.

At least one indicator 62 or 63 is placed in the vicinity of each of said strap passages 25. The indicator(s) 62 or 63 provide means for indicating that said strap passages 25 are able to receive said chest strap 61 in said forward-facing position and in said rear-facing position.

The upper portion of the seat back 22 has two strap passages 25 placed respectively on the two lateral edges 26 of said seat back 22. The passages are slots crossing said lateral edges 26.

The strap passage(s) 25 have at least two separate zones, each able to receive said chest strap 61 through bearing. When a chest strap 61 is set into place, said chest strap 61 circulates in a first zone of the slot 25 of a first of said lateral edges 26, and in the second zone of the slot 25 of the second of said lateral edges 26.

The slots have two slot portions 251, 252, an entry portion 251 and a bottom portion 252, forming a non-zero angle, and corresponding respectively to the first and to the second zones. The entry portion 251 is substantially vertical and defines at least one bearing surface for the portion of said chest strap 61 closest to the reel 66 of said strap. The entry portion 251 is reinforced in such a way that said chest strap 61 can come to bear on its two lips, according to that said armchair 2 is in said forward-facing position or in said rear-facing position. The bottom portion 252 is directed towards the rear of said seat back 22 and defines a bearing surface for the portion of said chest strap 61 farthest from the reel 66 of said strap.

The armchair 2 can have two positions of assembly in relation to said base 1, a forward-facing position and a rear-facing position and in that said base 1 has a single ventral strap passage. The ventral strap passage is formed on the lower face, coming into contact with the seat of the vehicle, of said base 1. The base 1 has a bevelled section, in such a way as to offset at least partially the inclination of the seat of the vehicle.

In an illustrative embodiment, the base 1 forming the lower portion of the vehicle seat 10 defines a reference plane that is not parallel to the lower bearing surface on the seat of the vehicle. This reference plane makes it possible to define an axis of symmetry, perpendicular to this plane.

As such, a section of the base 1 is inscribed, schematically, substantially in a triangle, and more exactly in a trapezoid. This trapezoid comprises four sides:
- a first side corresponding to the lower surface of the base 1, or bearing surface of the vehicle seat 10 on the seat of the seat of the vehicle;
- a second side corresponding to the upper surface of the base 1, or more generally to the reference plane, and which is not parallel to the first side;
- a third side, called thick edge or first end zone, corresponding to the rear of the base 1 (zone close to the seat back of the vehicle seat), and connecting the first and second sides; and
- a fourth side, called thin edge or second end zone, corresponding to the front of the base 1 (zone separated from the seat back of the vehicle seat), and connecting the first and second sides. This fourth side has a thickness less than the third side. Schematically, the fourth side, which can be thin, is assimilated in what follows to the tip of a triangle wherein the trapeze is inscribed.

In position of use, this base 1 is placed in the vehicle in such a way that the thick edge 11 of the base 1, or first end zone 11Z, is placed on the rear of the seat of the vehicle seat, in the vicinity of the seat back of the latter, and the tip of the triangle, corresponding to the thin edge 12 of the base 1, or second end zone 12Z, is placed on the front of the seat of the vehicle seat.

As such, the upper portion of the base 1, or second side, defines a plane close to the horizontal, and more preferably slightly inclined towards the front of the seat (and therefore the front of the vehicle).

The armchair 2 can be mounted on this base 1:
- either in a forward-facing configuration or "first position" as shown in FIGS. 3 and 4;
- or in a rear-facing configuration or "second position" for simplification, wherein the position of the armchair 2 corresponds to an axial symmetry of its position in forward-facing configuration, as shown in FIG. 5.

The base 1 remains in both cases in the same position, without modification when switching from rear-facing to forward-facing configuration and vice-versa. The thick edge 11 always remains in the vicinity of the seat back of the vehicle seat.

The plane of the upper surface of the base 1, or reference plane, forming an angle with the plane of the seat of the vehicle seat, or plane of the base 1 (angle between the first and the second sides), the axis of symmetry between the two positions of the armchair 2 forms the same angle with the perpendicular to the plane of the seat of the vehicle seat. The inclination of the armchair 2 of the vehicle seat 10 in relation to the plane of the seat of the vehicle seat is consequently different according to whether the vehicle seat 10 is in forwardly facing position or in the rear-facing position.

Furthermore, the armchair 2 can include means of inclination for comfort making it possible to vary the inclination of the seat 21 and/or of the seat back 22 of the armchair 2 in relation to the base 1, the extreme positions being shown respectively in FIGS. 3 and 4. These means for inclining are more preferably active only in the forward-facing position, means for locking preventing the use of the means for inclining for comfort in the rear-facing position.

Several modes for securing the armchair 2 to the base 1 can be considered within the scope of the present disclosure. For example, the base 1 and the armchair 2 can be provided with reversible assembly elements, allowing for an assembly in the two positions. According to another approach, the armchair 2 can pivot around the axis of symmetry relative to the base 1.

The invention claimed is:

1. A vehicle seat for children, comprising
a base and an armchair, the armchair including a seat and a seat back,
the seat back includes an upper portion having at least one chest strap passage integral to the seat back and having an upward facing opening, the at least one chest strap passage configured to receive a chest strap of a safety belt of a motor vehicle,
the at least one chest strap passage is configured to receive the chest strap in a forward-facing position and in a rear-facing position of the armchair, and that the chest strap circulates in the at least one chest strap passage included on the upper portion of the seat back in the forward-facing position and in the rear-facing position,
wherein the base is fixed in a single position and the armchair is movable between the forward-facing and rear-facing positions in relation to the base;
wherein the base includes a ventral strap slot configured to receive vertical ventral strap, the ventral strap slot including a downward-facing opening through which the ventral strap passes, and the ventral strap slot being fixed in the same position on the base relative to a seat of the motor vehicle when the armchair is in the forward-facing position and in the rear-facing position; and wherein the ventral strap slot is formed on a lower face of the base that is in contact with the seat of the motor vehicle.

2. The vehicle seat according to claim 1, wherein the at least one chest strap passage includes two chest strap passages, each of the two chest strap passages located on one of two lateral edges of the seat back.

3. The vehicle seat according to claim 2, wherein the two chest strap passages are chest strap passage slots crossing the lateral edges.

4. The vehicle seat according to claim 1, wherein the at least one chest strap passage includes at least two separate zones, each of the at least two separate zones configured to receive the chest strap on a chest strap passage bearing surface.

5. The vehicle seat according to claim 4, wherein when the chest strap is set into place, the chest strap circulates in a first zone of the strap passage slot of a first of the lateral edges and circulates in a second zone of the strap passage slot of a second of the lateral edges.

6. The vehicle seat according to claim 5, wherein the chest strap passage slots have two slot portions, an entry portion and a bottom portion, the portions forming a non-zero angle, and corresponding respectively to the first and to the second zones.

7. The vehicle seat according to claim 6, wherein the entry portion is substantially vertical and defines at least one chest strap passage bearing surface for the portion of the chest strap closest to a reel of the chest strap.

8. The vehicle seat according to claim 7, wherein the entry portion is reinforced in such a way that the chest strap is configured to bear on two lips of the entry portion, when the armchair is in the forward-facing position or in the rear-facing position.

9. The vehicle seat according to claim 6, wherein the bottom portion is directed towards the rear of the seat back and defines a chest strap passage bearing surface for the portion of the chest strap farthest from a reel of the chest strap.

10. The vehicle seat according to claim 1, wherein the base has a bevelled section configured to at least partially offset an inclination of the seat of the motor vehicle.

11. The vehicle seat according to claim 1, wherein the ventral strap slot includes a bearing surface and a retaining zone located on the bearing surface to retain the ventral strap in the ventral strap slot.

12. The vehicle seat according to claim 11, wherein the bearing surface is inclined relative to a substantially vertical plane that intersects substantially transversely with a lower surface of the base.

* * * * *